United States Patent Office 2,736,708
Patented Feb. 28, 1956

2,736,708
MAGNETIC COMPOSITIONS

Henry L. Crowley, South Orange, and Arthur M. Hossenlopp, Maplewood, N. J., assignors, by mesne assignments, to Henry L. Crowley & Company, Inc., West Orange, N. J., a corporation of New Jersey No Drawing. Application June 8, 1951,
Serial No. 230,706

3 Claims. (Cl. 252—62.5)

This invention relates to magnetic compositions, and articles formed therefrom, and has for its object the provision of certain improvements in the method of making the same. More particularly, the invention contemplates certain improvements in those methods of making magnetic compositions, and articles formed therefrom, described by one of us (Henry L. Crowley) in copending applications for Letters Patent of the United States Ser. No. 145,085, filed February 18, 1950, now Patent No. 2,575,099, and Ser. No. 226,545, filed May 15, 1951. Throughout this specification and the appended claims "magnetic composition" means the final or finished composition and includes articles made therefrom.

In the aforementioned patent and patent application, there are disclosed ferritic ferrite magnetic compositions composed principally of a mixed ferrite and metallic iron in a very fine state of dissemination, and methods of making the same. The finely disseminated iron (in cryptocrystalline form) of the composition is formed in the course of the spontaneous dissociation of ferrous oxide (FeO) when gradually cooled through at least a large part of the temperature range from about 1000° C. to about 300° C., and the mixed ferrite is formed by heat-treatment of a mixture of ferric oxide ($Fe_2O_3$) and two or more oxides of metals other than iron capable of modifying the magnetic and electrical properties of the composition. In the preferred compositions of Patent No. 2,575,099, the magnetic modifier is nickel oxide (NiO) and the conductance modifier (i. e. modifier of electrical properties) is zinc oxide (ZnO). Divalent metal oxides in the transition zone of the periodic system, and near or within the iron group, especially cobalt, manganese and divalent chromium, behave like nickel oxides as modifiers of magnetic properties, while stable divalent metal oxides of the second group of the periodic system, especially magnesium and divalent copper, behave like zinc oxide as modifiers of electrical properties. While divalent copper oxide is primarily a conductance modifier, it may also be used as a magnetic modifier. In application Ser. No. 226,545, the metal oxides (other than ferric oxide) are zinc oxide, magnesium oxide (MgO) and lithium oxide ($Li_2O$).

The methods disclosed in the aforementioned patent applications involve subjecting the initial oxide mixture composed of at least 50% by weight of ferric oxide and containing electrical and magnetic modifying metal oxides (e. g. zinc oxide and nickel oxide, respectively) to a two-stage heat-treatment. The first heat-treatment is carried out at a temperature of 800 to 1200° C. and the second heat-treatment is carried out at a somewhat higher temperature within the range of 1100 to 1450° C. The properties of the magnetic composition are influenced by the heat-treatment temperatures, and the respective temperatures of the two heat-treatments are determined (by experience or test) to impart to the composition the optimum electrical and magnetic properties for its intended use. The environments in which the initial oxide mixture and the product of the first heat-treatment are respectively heat-treated are so controlled that ferrous oxide is present in the resulting product at the conclusion of the second heat-treatment, and the product is gradually cooled through at least the greater part of the temperature range in which ferrous oxide spontaneously dissociates into metallic iron and magnetite ($Fe_3O_4$).

We have now discovered that the electrical and magnetic properties of the magnetic compositions of the aforementioned patent and application can be usefully enhanced by mixing a suitable additive agent with the product of the first heat-treatment. We have found a wide variety of agents capable of imparting improved electrical or magnetic or both properties to such compositions, when intimately mixed with the product of the first heat-treatment, and the resulting mixture is subsequently processed in accordance with the aforementioned methods. We have moreover found that the inclusion of such an additive agent in the initial oxide mixture does not impart similar improved properties to the final magnetic composition, and it therefore appears that the effectiveness of the additive agent is attained only when it is mixed with the product of the first heat-treatment. The reason for this is not entirely understood, but it is our present belief that during the first heat-treatment a certain amount of ferric oxide is converted to ferrous oxide, and during gradual cooling of the product of the second heat-treatment the ferrous oxide undergoes reversion to magnetite and minute particles of metallic iron. It appears that when the additive agent is incorporated in the product of the first heat-treatment, the iron particles formed by the spontaneous dissociation of the ferrous oxide in the product are effectively insulated from one another by the additive agent, and in consequence thereof the magnetic composition has improved electrical properties.

Based on the foregoing discoveries, the present invention contemplates (in practicing the aforementioned methods) intimately mixing with the product of the first heat-treatment an additive agent capable of usefully enhancing at least one of the electrical or magnetic properties of the magnetic composition, and subjecting the resulting mixture to the second heat-treatment and gradual cooling. Different additive agents impart different enhanced properties to the composition, some increasing the resistivity and some increasing the permeability, and the particular additive agent used in preparing a composition, as well as the amount used, will depend upon the intended use of the composition. The amount of additive agent incorporated in the product of the first heat-treatment may vary from 0.1 to 50 parts, and more usually from 1 to 25 parts, by weight per 100 parts of the product in which the agent is incorporated. The amount of additive agent used in preparing any particular composition will usually be determined by the intended use of the article formed therefrom, and especially the frequency of the exciting current, as more fully explained hereinafter. In general, the agents may be conveniently divided into three groups, according to the particular property they most significantly influence and improve. Group I includes agents that enhance the electrical properties of the magnetic composition, especially the Q value at various frequencies; and comprises (as far as now known to us) cobalt, nickel, oxides of cobalt (CoO and $Co_2O_3$), oxides of nickel (NiO and $Ni_2O_3$), compounds of cobalt and nickel which are converted to oxides on heating such as the hydroxides and carbonates, and lithium oxide most conveniently derived from lithium carbonate. Group II includes agents that enhance the electrical properties of the magnetic composition at low frequency, that is around 50 kilocycles, and comprises (as far as now known to us) lead oxide, magnesium oxide, berylium oxide, lithium chloride, lithium fluoride, lead titanate, boric acid, lead borate, lead, tellurium, tin, iron and copper. Group III includes agents that enhance the electrical and magnetic properties of the composition in the frequency range of 10 to 20 megacycles, and presently comprises molybdenum and mixtures of molybdenum and a nickel oxide.

Since the additive agent is mixed with the product of the first heat-treatment of the aforementioned methods of preparing magnetic compositions, a brief consideration of those methods is necessary for a full understanding and appreciation of the present invention.

In the practice of those methods, the initial oxide mixture is thoroughly mixed to produce a homogeneous dispersion of the metal oxides, so that the subsequent reactions take place uniformly throughout the entire mass of the mixture. The weight percentage of ferric oxide in the initial oxide mixture may vary from 50 to 90%, although usually not exceeding about 75%. The ratio of zinc oxide (or equivalent divalent metal oxide) to nickel oxide (or equivalent divalent metal oxide), in actual weight, may vary from about 2:1 to about 1:1.

The first heat-treatment is carried out in any suitable type of kiln or furnace at a temperature between 800 and 1200° C., and usually more advantageously between 900 and 1100° C. Compositions of superior magnetic and electrical properties are produced when the first heat-treatment is conducted under conditions promoting the removal of some, but not all, of the oxygen content of the ferric oxide component of the initial oxide mixture. Although heating of the initial oxide mixture to a temperature within the aforementioned range in an indifferent ambient atmosphere will effect a significant removal of oxygen from the ferric oxide, it has been found generally preferable to effect removal of a more substantial amount of oxygen from the ferric oxide by a reducing environment such as that provided by a reducing ambient atmosphere or by a reducing agent present in the initial oxide mixture, or both. A reducing ambient atmosphere may be provided conveniently by the products of combustion of a controlled mixture of fuel gas with a small deficiency of air. Reducing agents suitable for incorporation in the initial oxide mixture are represented by such carbonaceous materials as dextrin, starch, flour, cellulosic substances, etc., which may be added advantageously in amounts of from about 1 to about 5% by weight of the initial oxide mixture. The initial oxide mixture may be subjected to the first heat-treatment in granular (i. e. finely divided) form, or it may be agglomerated, preferably with the aid of a suitable binder, such as dextrin or the like, which may thus serve the dual function of reducing agent and binder.

In accordance with our present invention, the product resulting from the first heat-treatment is mixed with one or more additive agents of the character hereinbefore described. Where the oxide mixture is agglomerated during the first heat-treatment, the heat-treated agglomerates are crushed and ground. Even when the initial oxide mixture is heat-treated in granular form it is desirable to grind the heat-treated product to a predetermined particle size in order to secure better uniformity of treatment in the subsequent operations, as well as to provide such particle or crystal size as is best suited to the particular field of use of the magnetic composition. Generally speaking, in the use of the composition as a magnetic core, the higher the frequency of the energizing current, the finer should be the grinding. For use at the high frequencies where the advantages of the present invention are most pronounced, grinding should be carried to a fineness of at least 95% through 325 mesh (standard Tyler screen), and for some uses may advantageously be carried on further. The additive agent may advantageously be mixed with the product of the first heat-treatment during the grinding operation, so that the agent as well as the product are simultaneously ground to the predetermined fineness. In any event, the particle size of the additive agent should be of the same order as that of the product, and the agent should be intimately mixed with the product.

The finely ground mixture of additive agent and product of the first heat-treatment (with added binder) is compacted and pressed by any suitable apparatus into shaped articles of the shape and size predetermined by the shape and size of the final articles (e. g. magnetic cores). Due allowance should be made for shrinkage during the second heat-treatment, which may range from a few per cent up to 25%, and under the usual conditions of operation is around 10%. The added binder is preferably carbonaceous in character, such for example as a phenol formaldehyde resin, and from 1 to 3% by weight of the binder is usually satisfactory. Such an amount of a carbonaceous binder insures against undesirable oxidation of the composition of the shaped articles during the second heat-treatment yet is insufficient in itself to effect any further significant removal of oxygen from the iron oxide component of the composition during the second heat-treatment. Where such conditions can be insured by control of the ambient furnace atmosphere, the binder need not be carbonaceous.

Prior to the second heat-treatment, the shaped articles are advantageously given a curing or conditioning heat at a comparatively low temperature, say around 500–600° C. This step burns out, in part at least, the volatilizable constituents of the binder, and otherwise favorably conditions the article for the high temperature attained in the second heat-treatment. The curing heat is conveniently carried out in an externally-heated retort or muffle furnace in a generally neutral atmosphere. However, if the furnace or kiln used for effecting the second heat-treatment is of sufficient capacity to permit relatively slow heating of the shaped articles to a temperature of about 500–600° C. before subjecting them to the ultimate high temperature firing conditions, the curing heat may be provided in this manner rather than in a separate retort or furnace.

The second heat-treatment is carried out in any suitable type of kiln or furnace at a temperature between 1000 and 1450° C., and usually between 1100 and 1200° C. With some additive agents, the optimum temperature of the second heat-treatment for the intended use of the composition is lower than that generally employed in preparing similar compositions with no additive agent. This is especially so in the case of metallic copper which imparts useful electrical properties to the composition at a temperature of around 650° C. When the shaped articles have been formed with a carbonaceous binder, the residual carbonaceous constituent of the binder carried through to the high temperature stage of the second heat-treatment maintains the desired internal conditions within the articles. Under these circumstances, it has been found that the ambient atmosphere, such as that provided by the presently preferred direct firing of the articles by the products of combustion of a controlled mixture of fuel gas and air, may be substantially neutral or may be appreciably reducing or oxidizing according to conventional standards without having any significant effect upon the results of the second heat-treatment. A typical second heat-treatment cycle, subsequent to the aforementioned curing stage, comprises heating to the high ultimate temperature in about four hours, retention at that temperature for about eight hours, and gradual cooling through a period of four hours. Cooling from the ultimate high temperature to around 1000° C. and from around 300° C. to room temperature may be fairly rapid, but between 1000° C. and 300° C. the heat-treated articles should be gradually cooled over a period of four to six hours.

While it is now our preferred practice to conduct the first heat-treatment with the initial oxide mixture in a reducing environment, as hereinbefore described, it is possible to conduct the heat-treatment in a non-reducing environment, provided the environment in which the shaped articles are heat-treated is of such a character that some ferrous oxide is present in the composition of the shaped articles at the conclusion of the heat treatment.

Thus, the environments in which the initial oxide mixture and the shaped articles are respectively heat-treated should be of such character that some ferrous oxide is present in the composition of the shaped articles at the conclusion of the second heat-treatment. It is our present belief that the superior magnetic and electrical properties of the magnetic compositions (prepared as herein described) are due, at least in part, to the presence of ferrous oxide in the composition at the conclusion of the second heat-treatment, and to the gradual cooling of the heat-treated shaped articles through at least the greater part of the temperature range in which ferrous oxide spontaneously dissociates into metallic iron and magnetite. This dissociation appears to start shortly below the final high temperature of heat-treatment and is completed at about 300° C. In the course of the gradual cooling through the greater part of the temperature range of from about 1000° C. to about 300° C., the ferrous oxide present in the composition is believed to spontaneously dissociate into magnetite and metallic iron in an extremely fine state of subdivision (a far finer state of dissemination than is possible in powdered iron). The finely disseminated iron is crypto-crystalline in character, and constitutes the ferritic component of the composition. The ferrite component of the composition results for the most part from the interaction during heat-treatment of the metallic oxides in the initial oxide mixture.

Magnetic products or articles processed in accordance with the invention with one or more of the additive agents of group I are characterized by a high Q value at high frequency. Q value is defined in the following formula:

$$Q \text{ (value)} = \frac{2\pi F L e}{R} = \frac{2\pi F \mu e L}{R}$$

where $L$ is the self-inductance of the coil in air, $Le$ is the self-inductance of the coil with its intended magnetic core, $F$ is the frequency of the exciting magnetic field, $R$ is the equivalent series resistance (impedance) of the coil (including the copper resistance of the coil itself—increased by skin effect—and a component due to dielectric losses in the core, in the insulation of the winding, etc.), and $\mu e$ is the effective permeability (i. e. the ratio of the self-inductance of a coil having a magnetic core of given size and shape designed therefor to the self-inductance of the same coil with an air core).

While the individual behaviors of the additive agents of group I are not exactly alike, in general at frequencies around 50 megacycles and higher, the greater the amount of additive agent included in the magnetic composition the higher is the Q value at a given frequency. At frequencies between 1 and 50 megacycles, the maximum Q value is usually attained at a given frequency with from 2 to 20 parts of the modifying agent per 100 parts of the product of the first heat-treatment, while at lower frequencies (from 1 megacycle down to 50 kilocycles) the maximum Q value is usually attained at a given frequency with from 0.1 to 2 parts of the modifying agent on the same basis.

The enhanced electrical properties of magnetic articles (cores) processed in accordance with the invention are illustrated in the examples of the following tables. The initial oxide mixture consisted (in each example of all the tables) of 65% $Fe_2O_3$, 20% $ZnO$ and 15% $NiO$, and the first heat-treatment was carried out to produce a standard product with which the various additive agents were mixed and processed in accordance with the invention. The second heat-treatments were similarly carried out under identical conditions (unless otherwise noted) so that true comparisons of the resulting magnetic compositions could be made.

In Tables I, II, III and IV, varying amounts of cobalt oxide, metallic cobalt, nickel oxide, and metallic nickel, respectively, were mixed, in accordance with the invention, with the product of the first heat-treatment of an initial oxide mixture of 65% $Fe_2O_3$, 20% $ZnO$ and 15% $NiO$. The tables indicate the amount of additive agent in parts per 100 parts of the product of the first heat-treatment, and the Q value and effective permeability $\mu e$ at different frequencies. It should be noted that Q values can only be compared when determined at the same frequency. This is because different coils are used to determine the Q value at different frequencies. Thus, a Q value of 78 at one megacycle cannot necessarily be said to be inferior to a Q value of 206 determined at 50 kilocycles. If the Q values were determined for a dielectric, rather than for the core of a coil, then Q values at different frequencies would be comparable to one another, and when so determined it has been generally found that the Q values decrease as the frequency of the exciting current increases (Table V, hereinafter discussed).

TABLE I
*Cobalt oxide ($Co_2O_3$) as the additive agent*

| Parts $Co_2O_3$ | 50 kc. | | 1 mc. | | 10 mc. | | 20 mc. | | 50 mc. | |
|---|---|---|---|---|---|---|---|---|---|---|
| | Q | $\mu e$ | Q | $\mu e$ | Q | $\mu e$ | Q | $\mu e$ | Q | $\mu e$ |
| 0 | 176 | 2.85 | 62 | 6.41 | 47.5 | 4.52 | 20.8 | 3.21 | 17.5 | 1.58 |
| 0.1 | 221 | 3.12 | 74.1 | 6.45 | 65.7 | 5.15 | 23.3 | 3.15 | 18.8 | 1.54 |
| 0.2 | 212 | 2.84 | 79 | 5.98 | 103 | 4.50 | 30 | 3.03 | 21.4 | 1.53 |
| 0.3 | 212 | 2.94 | 78 | 6.09 | 129 | 4.71 | 36.6 | 3.06 | 21.4 | 1.52 |
| 0.4 | 212 | 2.89 | 78.5 | 6.02 | 139 | 4.60 | 40 | 3.04 | 22.7 | 1.51 |
| 0.5 | 212 | 2.91 | 78 | 6.05 | 141 | 4.67 | 41.6 | 3.06 | 22.1 | 1.53 |
| 0.6 | 206 | 2.83 | 78 | 5.88 | 155 | 4.48 | 64.4 | 3.01 | 24.7 | 1.51 |
| 0.7 | 204 | 2.81 | 79 | 5.84 | 154 | 4.46 | 74 | 3.00 | 24.7 | 1.53 |
| 0.8 | 206 | 2.91 | 78 | 5.95 | 159 | 4.46 | 86 | 3.04 | 24.6 | 1.54 |
| 0.9 | 206 | 3.04 | 76 | 6.09 | 159 | 4.95 | 89.4 | 3.06 | 24 | 1.55 |
| 1 | 199 | 2.77 | 80.7 | 5.64 | 151 | 4.38 | 91 | 2.97 | 27.5 | 1.47 |
| 3 | 168 | 2.54 | 75.2 | 5.00 | 132 | 3.92 | 116 | 2.73 | 84.4 | 1.47 |
| 5 | 141 | 2.45 | 66.9 | 4.54 | 107 | 3.49 | 100 | 2.57 | 93.8 | 1.43 |
| 10 | 85 | 2.07 | 50.5 | 3.40 | 67.5 | 2.94 | 70 | 2.50 | 85.5 | 1.31 |
| 20 | 62 | 1.63 | 40.5 | 2.37 | 50.9 | 2.08 | 55.9 | 1.68 | 81.2 | 1.19 |
| 50 | 54 | 1.21 | 42.9 | 1.39 | 52.5 | 1.34 | 60.6 | 1.19 | 88.4 | 1.05 |

TABLE II
*Metallic cobalt as the additive agent*

| Parts cobalt | 50 kc. | | 1 mc. | | 10 mc. | | 20 mc. | | 50 mc. | |
|---|---|---|---|---|---|---|---|---|---|---|
| | Q | $\mu e$ | Q | $\mu e$ | Q | $\mu e$ | Q | $\mu e$ | Q | $\mu e$ |
| 0 | 176 | 2.85 | 62 | 6.41 | 47.5 | 4.52 | 20.8 | 3.21 | 17.6 | 1.58 |
| 1 | 197 | 2.71 | 80.5 | 5.46 | 145 | 4.27 | 99 | 2.91 | 34.4 | 1.53 |
| 3 | 155 | 2.48 | 70.5 | 4.78 | 116 | 3.83 | 107 | 2.65 | 95 | 1.44 |
| 5 | 118 | 2.23 | 60.3 | 4.01 | 88.7 | 3.31 | 86 | 2.39 | 92.8 | 1.35 |
| 10 | 66 | 1.89 | 49.2 | 2.82 | 64.7 | 2.46 | 67.4 | 1.87 | 89.5 | 1.22 |
| 20 | 46 | 1.49 | 35.1 | 1.95 | 42.2 | 1.83 | 49.4 | 1.47 | 81.9 | 1.11 |

TABLE III
*Nickel oxide (NiO) as the additive agent*

| Parts NiO | 50 kc. | | 1 mc. | | 10 mc. | | 20 mc. | | 50 mc. | |
|---|---|---|---|---|---|---|---|---|---|---|
| | Q | $\mu e$ | Q | $\mu e$ | Q | $\mu e$ | Q | $\mu e$ | Q | $\mu e$ |
| 0 | 176 | 2.85 | 62 | 6.41 | 47.5 | 4.52 | 20.8 | 3.21 | 17.6 | 1.58 |
| 3 | 165 | 2.84 | 65 | 6.28 | 78.2 | 4.46 | 22.2 | 3.20 | 16.7 | 1.56 |
| 5 | 157 | 2.80 | 65 | 6.09 | 91.5 | 4.32 | 22.9 | 3.14 | 15.7 | 1.55 |
| 10 | 141 | 2.68 | 67 | 5.55 | 111 | 4.20 | 31.4 | 2.99 | 15.1 | 1.52 |
| 20 | 123 | 2.45 | 72 | 4.76 | 126 | 3.75 | 78.5 | 2.70 | 18.9 | 1.46 |
| 25 | 126 | 2.26 | 82.7 | 4.06 | 139 | 3.40 | 106 | 2.45 | 30.2 | 1.39 |
| 30 | 113 | 2.25 | 79.3 | 4.04 | 138 | 3.37 | 100 | 2.43 | 21.7 | 1.39 |
| 35 | 96 | 2.15 | 79.8 | 3.73 | 128 | 3.16 | 112 | 2.30 | 25.8 | 1.36 |

TABLE IV
*Metallic nickel as the additive agent*

| Parts nickel | 50 kc. | | 1 mc. | | 10 mc. | | 20 mc. | | 50 mc. | |
|---|---|---|---|---|---|---|---|---|---|---|
| | Q | $\mu e$ | Q | $\mu e$ | Q | $\mu e$ | Q | $\mu e$ | Q | $\mu e$ |
| 0 | 176 | 2.85 | 62 | 6.41 | 47.5 | 4.52 | 20.8 | 3.21 | 17.6 | 1.58 |
| 1 | 199 | 2.91 | 76.4 | 6.06 | 61.2 | 4.73 | 21.2 | 3.06 | 19.7 | 1.55 |
| 3 | 182 | 2.84 | 77.3 | 5.84 | 85 | 4.56 | 23.5 | 3.03 | 19.4 | 1.54 |
| 5 | 169 | 2.73 | 76.8 | 5.58 | 124 | 4.34 | 34.2 | 2.99 | 19.4 | 1.50 |
| 10 | 146 | 2.63 | 74.4 | 5.23 | 137 | 4.09 | 49.6 | 2.85 | 18.1 | 1.50 |
| 20 | 122 | 2.23 | 81.8 | 4.08 | 138 | 3.18 | 109 | 2.44 | 32.2 | 1.39 |

Referring to Table I, it will be seen that small amounts of added cobalt oxide (up to about 1 part) increases the Q value at 50 kilocycles. With increased amounts of added cobalt oxide, the Q value at 50 kilocycles drops off, and decreases to a relatively low value with 50 parts of the added oxide. If the Q values at 50 kilocycles are plotted against the amounts of added oxide, the amount of added oxide that results in the maximum Q value at this frequency can be determined. Similarly, at higher frequencies, the amount of added oxide that results in the maximum Q value can be determined. It will be seen that at higher frequencies, greater amounts of added oxide are required to attain the maximum Q value. Thus, in general, the higher the frequency at which the Q value is determined, the greater is the required amount of added oxide in order to produce a final product having the maximum Q value. Tables II, III and IV show the same general trends as Table I.

Table V shows determinations of Q values at relatively high frequencies for products processed in accordance with the invention with varying amounts of cobalt oxide and metallic cobalt. The Q values were determined with the products used as dielectrics rather than as cores of a coil. In this table, the Q values determined at different frequencies are comparable with one another, and the table shows that in general the Q value decreases with increase in frequency. Since different methods were used when determining the Q values as a dielectric than when determining the Q values as the core of a coil, the Q values of Table V are in no way comparable with those of Tables I–IV.

TABLE V

| Additive agent | Q at— | | | | |
|---|---|---|---|---|---|
| | 80 mc. | 110 mc. | 140 mc. | 170 mc. | 220 mc. |
| 1 parts $Co_2O_3$ | 74 | 50 | 30 | 28 | 16 |
| 3 parts $Co_2O_3$ | 87 | 48 | 28 | 20 | 15 |
| 3 parts Cobalt | 325 | 132 | 97 | 64 | 29 |
| 10 parts $Co_2O_3$ | 440 | 220 | 183 | 118 | 126 |

If the data of Table V is plotted for each product using Q values as the vertical axis and frequency as the horizontal axis, a very interesting and important property of the new products becomes apparent. Thus, the slope of the curve ($dQ/dF$) decreases sharply as the frequency increases and levels off and becomes generally parallel to the horizontal axis. Thus, above a certain minimum frequency, which is dependent upon the composition of the product, the Q value is about the same at any frequency. This valuable property enables use of the product in an indefinitely broad frequency above the minimum frequency under conditions where constant Q value is required. The available data indicate that products containing greater amounts of additive agent yield curves of Q values against frequency that level off at higher frequencies and with higher Q values than do the curves for products containing smaller amounts of the added agent. For example, the first product of Table V (1 part added $Co_2O_3$) has a substantially constant Q value of about 16 at frequencies above about 200 megacycles, whereas the Q value of the fourth product of Table V (10 parts of added $Co_2O_3$) levels off at about 100 at frequencies above about 400 megacycles.

Referring again to Tables I–IV, it will be noted that the effective permeability tends to decrease somewhat as the amount of the additive agent is increased, but in many cases this decrease is not particularly significant percentagewise. However, in general, high effective permeability is not so important for high frequency applications as for lower frequency applications.

Products processed in accordance with the invention with an additive agent of group I not only exhibit superior Q values over similar products without the additive agent, but are comparable in Q value and effective permeability to the best powdered iron cores available. Tests conducted on various types of powdered iron cores indicate that at a frequency of 10 megacycles, the best iron core had a Q value of about 144. At the same frequency, the tenth product of Table I (0.9 part of added $Co_2O_3$) exhibited a Q value of 159. In addition, the new product had an effective permeability, under the same conditions, of almost twice that of the best powdered iron core.

In practicing the invention, it is essential that the additive agent be added to the product of the first heat-treatment, rather than to the initial oxide mixture. Table VI shows the superior Q and effective permeability values at different frequencies of a product (C) processed in accordance with the invention and containing 5 parts of cobalt oxide (added to 100 parts of the product of the first heat-treatment), as compared with a similar product (A) without additive agent, and with a similar product (B) in which the same proportion (5 parts) of additive agent was incorporated in the initial oxide mixture. It should be noted that any discrepancies between the electrical properties of products reported in Tables I through IV and apparently similar products referred to in Table VI can be attributed to differences in the temperatures attained in the second heat-treatment of these products, the products referred to in Tables I through IV having been heated to about 1150° C. and the products referred to in Table VI having been heated to about 1315° C. in their respective second heat-treatments.

TABLE VI

| Product | 50 kc. | | 1 mc. | | 10 mc. | | 20 mc. | | 50 mc. | |
|---|---|---|---|---|---|---|---|---|---|---|
| | Q | $\mu e$ | Q | $\mu e$ | Q | $\mu e$ | Q | $\mu e$ | Q | $\mu e$ |
| A. Without additive agent | 210 | 2.98 | 68.5 | 6.62 | 28.2 | 4.76 | 17.6 | 3.20 | 19.5 | 1.53 |
| B. 5 parts $Co_2O_3$ added to initial oxide mixture | 162 | 2.67 | 68.1 | 5.18 | 48.9 | 4.21 | 28.8 | 2.80 | 22.7 | 1.47 |
| C. 5 parts $Co_2O_3$ added to product of 1st heat treatment | 153 | 2.46 | 68.5 | 4.87 | 78 | 3.75 | 58.1 | 2.70 | 44.1 | 1.43 |

While the mere presence of the additive agent somewhat improves the properties of the composition at high frequencies, it will be seen from Table VI that the noteworthy and significant improvements from a practical standpoint are effected when the additive agent is added to the product of the first heat-treatment, rather than to the initial oxide mixture.

In the examples of Tables VII and VIII, cobalt carbonate and lithium carbonate were the additive agents, and in the course of the heat-treatments were converted to the respective oxides. The specimens of Tables VII and VIII were processed at second heat-treatment temperatures of 1170 and 1093° C., respectively. These tables give the Q value and capacitance (C) for exciting currents of different frequencies. Since capacitance was determined under such conditions that an air core in the test coil had a capacitance of 100, the capacitance values are a direct measure of effective permeability, and the effective permeability may be readily obtained by dividing the capacitance value into 100.

TABLE VII

Cobalt carbonate ($CoCO_3$) as the additive agent

| Parts $CoCO_3$ | 50 kc. | | 1 mc. | | 10 mc. | | 20 mc. | | 50 mc. | |
|---|---|---|---|---|---|---|---|---|---|---|
| | Q | C | Q | C | Q | C | Q | C | Q | C |
| 0.7 | 218 | 29.3 | 79 | 15.2 | 56 | 17.5 | 21.7 | 30.2 | 15.7 | 62.2 |
| 1.4 | 210 | 29.7 | 80.9 | 15.5 | 100 | 17.8 | 31.9 | 30.6 | 17 | 62.5 |
| 4.2 | 175 | 30.5 | 74.5 | 16.8 | 128 | 18.6 | 98.7 | 32.6 | 27.7 | 63.1 |
| 7 | 148 | 37.9 | 73 | 20.7 | 108 | 24.3 | 93.5 | 36.8 | 47.8 | 68.3 |
| 14 | 88.5 | 45.3 | 49.3 | 27.5 | 65.5 | 31.0 | 66.5 | 44.3 | 83 | 74.2 |

TABLE VIII

Lithium cabonate ($Li_2CO_3$) as the additive agent

| Parts $Li_2CO_3$ | 50 kc. | | 1 mc. | | 10 mc. | | 20 mc. | | 50 mc. | |
|---|---|---|---|---|---|---|---|---|---|---|
| | Q | C | Q | C | Q | C | Q | C | Q | C |
| 0 | 190 | 33.6 | 64.2 | 14.9 | 38.8 | 20.9 | 18.1 | 30.4 | 16.1 | 62.4 |
| 1 | 187 | 32.9 | 74.2 | 16.9 | 79.6 | 20.1 | 38.2 | 33.2 | 17.5 | 65.2 |
| 3 | 145 | 36.9 | 68.1 | 19.8 | 105 | 23.3 | 92.1 | 36.9 | 50.9 | 67.5 |
| 5 | 122 | 38.7 | 60.9 | 21.7 | 87.5 | 24.8 | 79.9 | 38.9 | 62.5 | 70.2 |
| 10 | 78 | 47.7 | 45.7 | 30 | 58.9 | 33.2 | 63.5 | 47.6 | 81.9 | 77.4 |

Table IX shows the improved electrical properties imparted at low frequency to the magnetic composition by the additive agents of group II. In all of the examples of this table, an exciting current of 50 kilocycles was used to induce magnetism in the test piece. As shown by item 12 of this table, metallic copper imparts useful electrical properties to the composition at an exceptionally low temperature of second heat-treatment, namely 649° C.

TABLE XI

Additive agents of group II

| Parts additive agent | 2nd heat-treatment temperature, °C. | Q | C |
|---|---|---|---|
| 1. Lead oxide (PbO): | | | |
| 0 | 1066 | 173 | 34.1 |
| 3 | 1066 | 199 | 35.1 |
| 5 | 1066 | 202 | 33.3 |
| 10 | 1066 | 194 | 36.1 |
| 20 | 1066 | 182 | 39.6 |
| 0 | 1150 | 176 | 35.0 |
| 3 | 1150 | 199 | 34.1 |
| 5 | 1150 | 208 | 34.7 |
| 10 | 1150 | 188 | 36.2 |
| 20 | 1150 | 181 | 40.5 |
| 2. Lithium chloride (LiCl): | | | |
| 0 | 1093 | 190 | 33.6 |
| 1 | 1093 | 215 | 33.2 |
| 3 | 1093 | 186 | 36.4 |
| 3. Lithium fluoride (LiF): | | | |
| 0 | 1093 | 190 | 33.6 |
| 1 | 1093 | 214 | 32.7 |
| 3 | 1093 | 207 | 33.4 |
| 4. Lead titanate ($PbTiO_4$): | | | |
| 0 | 1038 | 145 | 35.5 |
| 1 | 1038 | 167 | 34.5 |
| 3 | 1038 | 199 | 34.9 |
| 5 | 1038 | 191 | 34.2 |
| 0 | 1150 | 176 | 35.0 |
| 1 | 1150 | 210 | 35.2 |
| 3 | 1150 | 204 | 36.1 |
| 5 | 1150 | 194 | 35.3 |
| 10 | 1150 | 191 | 36.2 |
| 20 | 1150 | 172 | 37.8 |
| 5. Lead (Pb): | | | |
| 0 | 1138 | 145 | 35.5 |
| 1 | 1138 | 200 | 35.4 |
| 3 | 1138 | 197 | 35.0 |
| 5 | 1138 | 190 | 36.5 |
| 10 | 1138 | 202 | 35.2 |
| 20 | 1138 | 191 | 38.2 |
| 6. Magnesium oxide (MgO): | | | |
| 0 | 1093 | 190 | 33.6 |
| 3 | 1093 | 201 | 33.2 |
| 5 | 1093 | 197 | 34.4 |
| 10 | 1093 | 194 | 35.7 |
| 20 | 1093 | 176 | 40.1 |
| 7. Tellurium (Te): | | | |
| 0 | 1093 | 190 | 33.6 |
| 1 | 1093 | 213 | 33.4 |
| 3 | 1093 | 211 | 34.3 |
| 5 | 1093 | 197 | 33.4 |
| 8. Tin (Sn): | | | |
| 0 | 1150 | 176 | 35 |
| 1 | 1150 | 207 | 34 |
| 3 | 1150 | 186 | 34.4 |
| 5 | 1150 | 178 | 32.9 |
| 9. Beryllium oxide (BeO): | | | |
| 0 | 1093 | 190 | 33.6 |
| 1 | 1093 | 209 | 34 |
| 3 | 1093 | 205 | 34.6 |
| 5 | 1093 | 211 | 31.6 |
| 10 | 1093 | 200 | 33.5 |
| 20 | 1093 | 185 | 36.7 |
| 10. Boric acid ($H_3BO_3$): | | | |
| 0 | 1038 | 145 | 35.5 |
| 1 | 1038 | 208 | 31.8 |
| 3 | 1038 | 190 | 32.6 |
| 5 | 1038 | 181 | 31.5 |
| 10 | 1038 | 152 | 32.1 |
| 20 | 1038 | 118 | 35.2 |
| 11. Iron (Fe): | | | |
| 0 | 1150 | 176 | 35 |
| 1 | 1150 | 199 | 34.2 |
| 3 | 1150 | 201 | 32.8 |
| 10 | 1150 | 195 | 32.2 |
| 20 | 1150 | 204 | 31.3 |
| 12. Copper (Cu): | | | |
| 0 | 1150 | 176 | 35 |
| 1 | 1150 | 189 | 35 |
| 3 | 1150 | 184 | 35 |
| 5 | 1150 | 202 | 34.9 |
| 10 | 1150 | 193 | 35.4 |
| 20 | 1150 | 182 | 40.9 |
| 0 | 649 | 141 | 37.9 |
| 1 | 649 | 162 | 36.5 |
| 3 | 649 | 168 | 35.5 |
| 13. Lead borate ($Pb_3(BO_3)_2$): | | | |
| 0 | 1066 | 173 | 34.1 |
| 3 | 1066 | 197 | 34 |
| 5 | 1066 | 191 | 33.9 |
| 10 | 1066 | 196 | 35 |
| 15 | 1066 | 191 | 35 |
| 20 | 1066 | 188 | 35.9 |
| 0 | 1150 | 176 | 35 |
| 3 | 1150 | 207 | 34.6 |
| 5 | 1150 | 202 | 34.6 |
| 10 | 1150 | 195 | 35 |
| 15 | 1150 | 188 | 36.2 |
| 20 | 1150 | 182 | 36.2 |

Table X shows the improved electrical and magnetic properties imparted in the frequency range of 10 to 20 megacycles to the magnetic composition by the additive agents of group III. In all of the examples of this table, the second heat-treatment was carried out at 1038° C.

TABLE X

| Parts additive agent | Frequency of exciting current, megacycles | Q | C |
|---|---|---|---|
| 1. Molybdenum (Mo): | | | |
| 0 | 10 | 24.5 | 22.4 |
| 1.75 | 10 | 134 | 22.6 |
| 2.0 | 10 | 117 | 21.5 |
| 3.0 | 10 | 53.2 | 25.2 |
| 5.0 | 10 | 42.3 | 23.4 |
| 2. Mixture of molybdenum and nickel oxide ($Ni_2O_3$): | | | |
| 0 | 20 | 24.5 | 22.4 |
| 1 Mo+3 $Ni_2O_3$ | 20 | 115 | 20 |
| 1 Mo+5 $Ni_2O_3$ | 20 | 159 | 21.6 |
| 1 Mo+10 $Ni_2O_3$ | 20 | 159 | 21.9 |
| 1 Mo+20 $Ni_2O_3$ | 20 | 159 | 24.2 |
| 1 Mo+30 $Ni_2O_3$ | 20 | 157 | 28.9 |

We claim:
1. In a method of preparing a magnetic composition in which ferric oxide, nickel oxide and zinc oxide are intimately mixed to produce an initial oxide mixture containing from 50 to 90% by weight of ferric oxide and in which the weight ratio of zinc oxide and nickel oxide is between about 2 to 1 and about 1 to 1, the oxide mixture is subjected to a two-stage heat-treatment followed by gradual cooling of the product of the second stage of heat-treatment and in the course of the first heat-treatment a portion of the ferric oxide is reduced to ferrous oxide and at the conclusion of the first heat-treatment the heat-treated product contains ferrous oxide and is non-magnetic, the first heat-treatment being carried out at a temperature between 800° and 1200° C. under non-oxidizing conditions, and the second heat-treatment being carried out at a somewhat higher temperature between 1000° and 1450° C., under non-oxidizing conditions, the non-oxidizing conditions of at least one of said heat-treatments being reducing to insure the presence of ferrous oxide in the second heat-treatment; the improvement which comprises intimately mixing with the product of the first heat-treatment an oxide of cobalt in the amount, expressed as $Co_2O_3$, of from 0.1 to 50 parts by weight of said oxide of cobalt per 100 parts by weight of said product.

2. The improvement according to claim 1 in which there is intimately mixed with the product of the first heat-treatment from 1 to 25 parts by weight of oxide of cobalt per 100 parts of said product.

3. The method according to claim 2 in which there is intimately mixed with the product of the first heat-treatment from 5 to 10 parts by weight of oxide of cobalt per 100 parts of said products.

References Cited in the file of this patent

UNITED STATES PATENTS

| | | |
|---|---|---|
| 1,997,193 | Kato et al. | Apr. 9, 1935 |
| 2,575,099 | Crowley | Nov. 13, 1951 |
| 2,640,813 | Berge | June 2, 1953 |